United States Patent [19]

Bradford et al.

[11] 3,998,055

[45] Dec. 21, 1976

[54] TURBOCHARGER FOR MARINE ENGINES

[75] Inventors: John O. Bradford, Gibson City; Elmo R. Meiners, Anchor, both of Ill.

[73] Assignee: M & W Gear Company, Gibson City, Ill.

[22] Filed: Apr. 3, 1975

[21] Appl. No.: 564,778

[52] U.S. Cl. .......................... 60/599; 123/122 AB; 123/122 AC; 123/119 C

[51] Int. Cl.$^2$ ....................................... F02B 29/04

[58] Field of Search ............. 123/122 AB, 122 AC, 123/119 C, 122 A, 119 CD; 60/599, 605; 165/52

[56] References Cited

UNITED STATES PATENTS

| | | | |
|---|---|---|---|
| 1,437,395 | 12/1922 | Brush | 123/122 AC |
| 2,372,272 | 3/1945 | Helmore | 123/119 C |
| 2,936,746 | 5/1960 | Rundquist | 123/122 A |
| 3,595,013 | 7/1971 | Brille et al. | 60/599 |
| 3,636,935 | 1/1972 | Martens | 123/122 AB |
| 3,762,385 | 10/1973 | Hollnagel | 123/122 A |

*Primary Examiner*—Ronald H. Lazarus
*Attorney, Agent, or Firm*—Allegretti, Newitt, Witcoff & McAndrews

[57] ABSTRACT

A turbocharger especially for marine engines includes a dual chamber block interposed between the carburetor and the turbocharger. The block includes a first chamber for receipt of a fuel air mixture and a second chamber separated by a heat transfer wall from the first chamber. The second chamber receives hot water from the cooling system of the engine and effectively directs heat through the heat transfer wall to prevent condensation of fuel from the fuel air mixture in the first chamber. Consequently, it is possible to use a rich air fuel mixture and maintain the mixture in a vaporized state to prevent premature detonation and deterioration of the engine.

5 Claims, 5 Drawing Figures

TURBOCHARGER FOR MARINE ENGINES

BACKGROUND OF THE INVENTION

This invention relates to an improved turbocharger assembly and, more particularly, to a turbocharger assembly for internal combustion marine engines.

Generally, an internal combustion engine utilizes a carburetor which provides a fuel air mixture through a manifold directly to the internal combustion chambers of the engine. In order to increase power and efficiency of an engine, however, turbocharger assemblies have in the past been utilized. Such assemblies pressurize the air fuel mixture delivered to the internal combustion chambers. This has the effect of increasing the efficiency and power output of the internal combustion engine. Utilization of turbocharger assemblies has, however, not been popular for marine engines.

A difficulty encountered with turbocharger assemblies is the sometimes hazard of predetonation of the air fuel mixture. To prevent predetonation, a fuel rich mixture may be used. However, the fuel from such a mixture tends to condense causing a potential hazard, especially on a boat. The present invention seeks to avoid such hazards.

SUMMARY OF THE INVENTION

In a principal aspect, the present invention comprises a marine engine turbocharger assembly. The engine is a fluid cooled type and includes a carburetor for mixing air and fuel. The turbocharger assembly includes a dual chamber block upon which the engine carburetor is mounted. One chamber of the block receives the combustible fuel gas mixture and directs that mixture to a turbocharger unit which, in turn, directs the mixture to the combustion chambers. A second chamber of the block receives fluid from the cooling system of the internal combustion engine and directs that fluid against a heat transfer wall separating the chambers of the block. Thereby, the hot fluid associated with the cooling system fuel air mixture within the first chamber is maintained in a vaporized state even when the fuel air mixture is rich.

It is thus an object of the present invention to provide an improved turbocharger assembly especially useful for marine engine applications.

It is a further object of the present invention to provide an improved turbocharger assembly including a separate dual chamber block having a heat transfer wall separating the chambers, one of the chambers being for receipt of a fuel air mixture and the second chamber being for receipt of a fluid medium to heat the fuel air mixture.

Still another object of the present invention is to provide a turbocharger assembly of improved construction wherein premature detonation of a fuel air mixture directed from a carburetor to a combustion chamber is avoided.

Still another object of the present invention is to provide a turbocharger assembly of simplified construction and low cost which serves to improve the efficiency and poweroutput of an internal combustion engine, particularly a marine engine.

These and other objects, advantages and features of the present invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
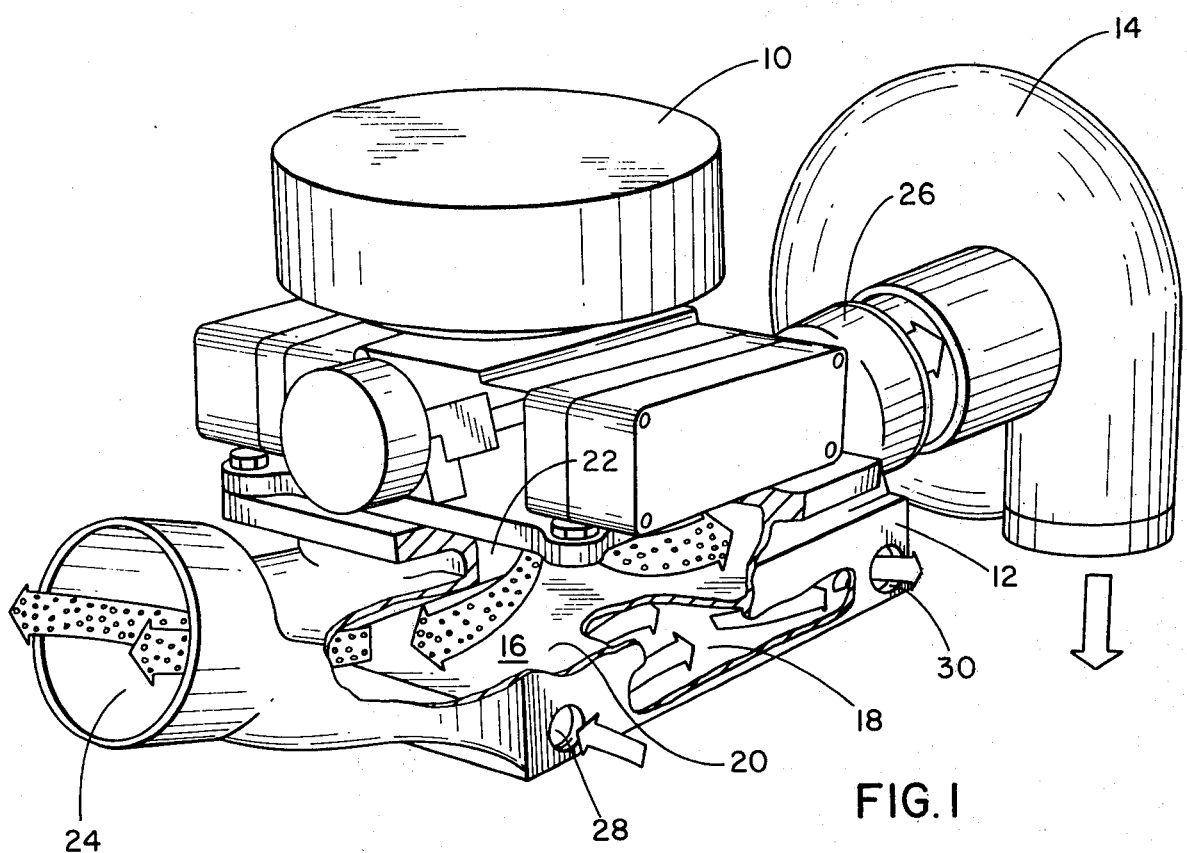
FIG. 1 is a cut-away perspective view illustrating one embodiment of the turbocharger assembly of the present invention.

FIGS. 1 through 4 illustrate an embodiment of the invention having a dual fuel air mixture output of a type which can be advantageously utilized with a V-8 internal combustion engine. Referring first to FIG. 1, the turbocharger assembly is generally comprised of a carburetor 10 mounted on a special vaporization block assembly 12. Air fuel mixture passes from the carburetor 10 through the block 12 to a turbocharger unit 14 often called a "blower".

The air fuel mixture then passes from the turbocharger 14 to the fuel intake manifold (not shown) for the internal combustion engine and ultimately to the compression chambers associated with the internal combustion engine. The structural features of the engine including the manifold, engine block and the like are not depicted in the drawings since these are well known in the art. It is noted that this invention is particularly applicable to marine engines.

The carburetor 10 is a structure or device well known to those skilled in the art as is the turbocharger 14. The block 12, however, constitutes a new and unique apparatus which alone and in combination with the other components of the turbocharger assembly comprise the present invention. For this reason, the following description will be primarily directed to the structure and operation of the block 12 keeping in mind that it is used in combination with other elements of a turbocharger assembly known to those skilled in the art.

Referring therefore to FIGS. 1 through 4, the block 12 is a cast metal structure which includes a first or fuel air chamber 16 and a second or hot water chamber 18. The chambers 16 and 18 are adjacent each other and are separated by a heat transfer wall 20. The block 12 includes a carburetor inlet 22 connected with chamber 16. Opposed fuel air mixture outlets 24 and 26 extend from the chamber 16. It will be noted that the inlet 22 is directed substantially to the mid portion of the chamber 16 whereas the outlets 24 and 26 extend in opposite directions from the ends of the chamber 16.

The second chamber 18 includes a hot water inlet 28 for receipt of fluid from the cooling system associated with the internal combustion engine. This fluid is normally water. In this instance, water from the cooling manifold associated with the internal combustion engine passes through inlet 28, second chamber 18 and through a second outlet 30. Water from outlet 30 then passes through the cooling coils or radiator associated with the internal combustion engine. This is the preferable sequence of fluid flow associated with the cooling system in combination with the turbocharger assembly of the present application.

Figure 2:
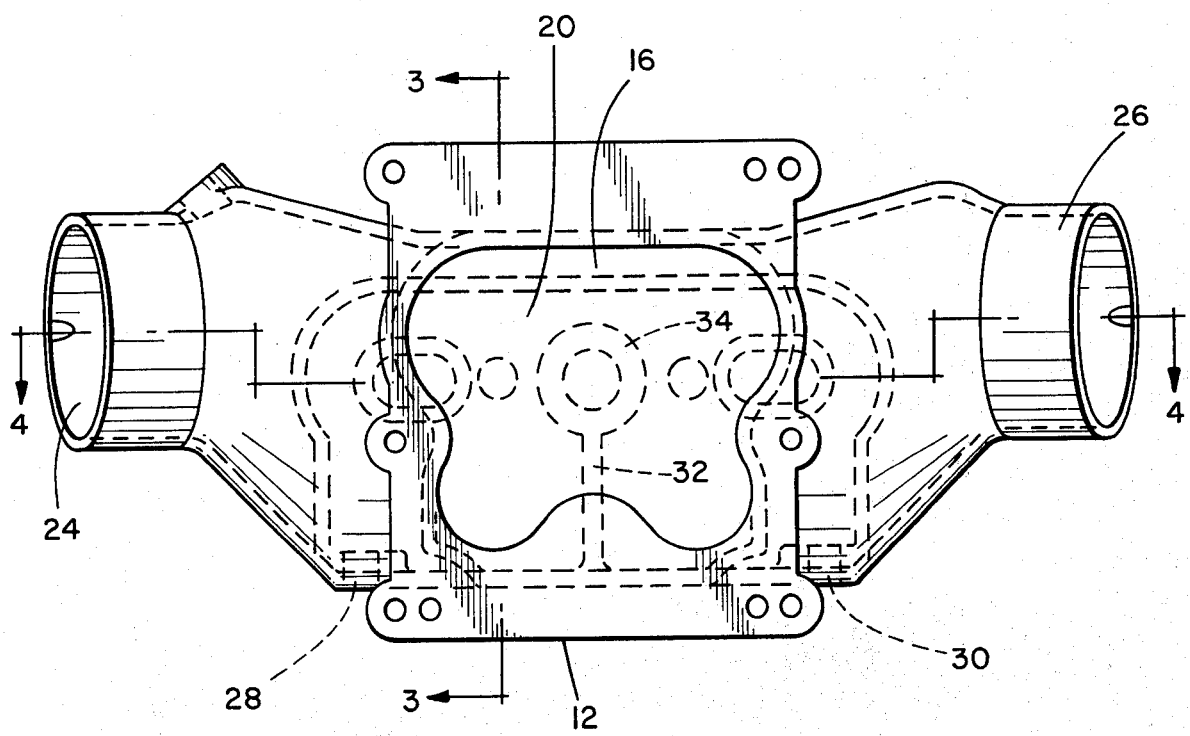
FIG. 2 is a top plan view of the dual chamber block component of the turbocharger assembly.
Figure 3:
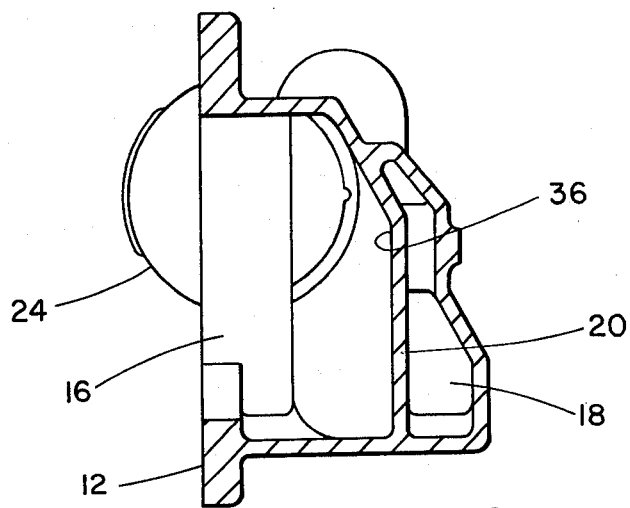
FIG. 3 is a cross-sectional view of the block of FIG. 2 taken along the line 3—3.
Figure 4:
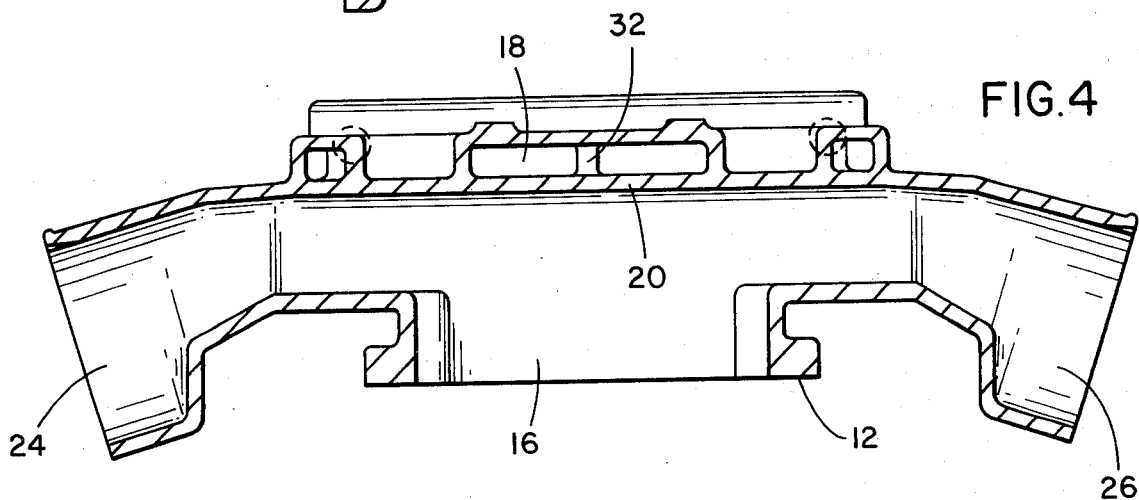
FIG. 4 is a cross-sectional view of the block of FIG. 2 taken along the line 4—4 in FIG. 2.

Chamber 18 optionally includes various baffles and walls such as wall 32 and baffle 34 shown in FIG. 2 to insure that the fluid flowing through the chamber 18 does not short circuit or channel its flow path through that chamber 18. This insures complete mixing and proper flow through of fluid in chamber 18 to maintain the heat transfer wall 20 at an elevated temperature. Thus, normally the water temperature associated with the cooling system of the internal combustion engine is in the vicinity of 150°–180° F. It is a purpose of this particular structure to maintain the heat transfer wall 20 in approximately the same temperature range.

Another important feature of the block 12 is the substructure of the heat transfer wall 20. The wall 20 is substantially horizontal during normal operation of the turbocharger assembly. In this manner, because of gravitational effects on condensed fuel, the wall 20 serves as a collection plate for fuel which condenses from the fuel air mixture discharged by carburetor 10 through inlet 22 to chamber 16. Preferably, a portion of the heat transfer wall 20 is inclined slightly to define a trough which serves as a collecting area 36 in FIG. 3 for condensed fuel. Preferably, this area 36 is substantially in the mid point or center region of the wall 20 and also defines the region of maximum heat transfer through the wall 20 from the second chamber 18 to the first chamber 16. Thus, heat transfer through wall 20 will vaporize excess fuel collected in area 36.

Figure 5:
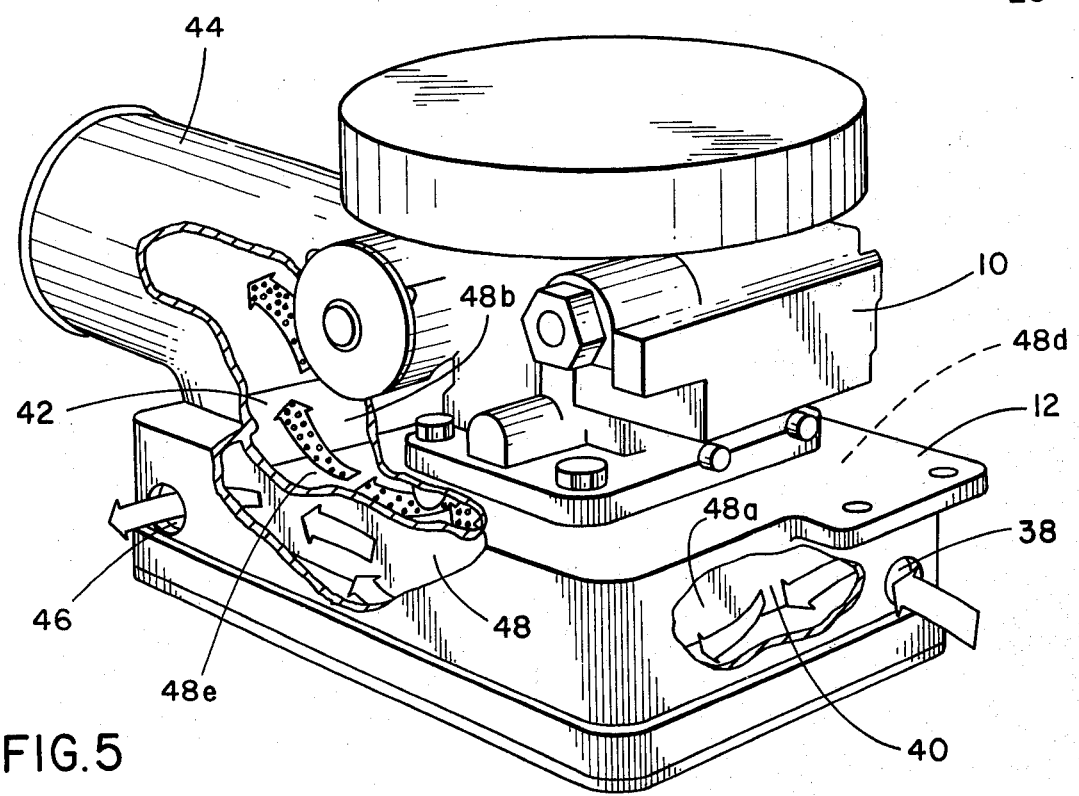
FIG. 5 is a cut-away perspective view of an alternative turbocharger assembly.

FIG. 5 illustrates an alternate construction for the present invention. It will be noted that the assembly of FIG. 5 includes a carburetor 10. However, the construction of block 12 has been altered. That is, in the structure of FIG. 5, hot water from the engine passes through inlet 38 and into a second chamber 40. The second chamber 40 defines a passageway or channel circumferentially surrounding a first chamber 42 that receives the fuel air mixture.

A central passage (not shown) connects the carburetor 10 to the first chamber 42 for flow of the fuel air mixture from the carburetor 10 to the first chamber 42. A fuel air exit or outlet 44 is also provided from the first chamber 42.

Hot water passing through the first chamber 40 returns to the cooling system associated with the internal combustion engine via hot water outlet 46 defined in the block 12. It is to be noted that the inlet 38 and the outlet 46 are positioned at opposite ends and substantially on opposite sides of the rectangularly shaped block 12. Also, the fluid flow path through the second chamber 40 permits fluid flow on five sides of the first chamber 42. That is, wall 48 is the heat transfer wall and comprises opposite end walls 48A and 48B, opposed side walls 48C and 48D and a bottom wall 48E. Water passing through inlet 38 circulates and flows within second chamber 40 against all of the walls 48A-48E to thereby transfer heat to the first chamber 42 from the second chamber and thus vaporize the fuel air mixture. Again, it is possible to include appropriate baffles within the second chamber 40 to channel and guide the fluid medium and effect best heat transfer. Also, the lower or bottom wall 48E may include a trough of the type described in the embodiment of FIGS. 1–4.

With the turbocharger of the present invention it is possible to eliminate throttle lag, i.e., a lag in response of the engine to changes of throttle settings. With the structure of the present invention, it is also possible to safely increase the power of a normal internal combustion engine by 20 to 30%.

The turbocharger unit offers a successful means of moderately turbocharging a standard production gasoline fueled four stroke cycle engine as used in the automotive or marine field. Problems such as poor idle speed, mid-range lag and full throttle response normally associated with standard engines when turbochargers are added are resolved.

Note that with a turbocharger assembly, it is generally necessary to increase the ratio of fuel to air, thus making the mixture rich. A rich mixture prevents premature detonation of the air fuel mixture, thereby avoiding deterioration of the engine. Most supercharged engines, however, require a higher throttle setting due to the rich fuel mixture. The higher setting prevents stalling of the engine. With the present invention, however, it is possible to maintain the idle of the engine at the same level or rpm as the idle associated with a natural aspiration carburetor.

Various modifications may be made within the scope and spirit of the present invention. Thus, the present invention is to limited only by the following claims and their equivalents.

What is claimed is:

1. A turbocharger assembly in combination with an internal combustion marine engine of the type including a carburetor for mixing air and fuel, a fuel inlet manifold, and fluid cooling means for cooling the engine, said turbocharger assembly comprising, in combination:
    a turbocharger mounted on the engine and having an outlet to the fuel inlet manifold of the engine;
    a dual chamber block including means for mounting said block on said engine and means for mounting the carburetor on the block,
    said block including an opening for receipt of an air fuel mixture from the carburetor mounted thereon, said opening in communication with a first chamber within said block, an outlet from said first chamber for connection to the inlet of the turbocharger;
    a second chamber in the block adjacent said first chamber and separated therefrom by a heat transfer wall;
    at least one fluid inlet and one fluid outlet from said second chamber; and
    fluid connection means for connecting the fluid inlet and outlet to the flow of fluid in the fluid cooling means of said engine whereby said air-fuel mixture within said first chamber is heated and vaporized continuously by heat transferred from fluid flowing through said second chamber.

2. The improved combination of claim 1 including at least one baffle within said second chamber for directing fluid flow from said inlet to said outlet.

3. The improved combination of claim 1 wherein said heat transfer wall comprises a substantially horizontal wall separating the first chamber and second chamber.

4. The improved combination of claim 1 wherein said heat transfer wall comprises a substantially horizontal, planar wall separating said first chamber and said second chamber, said heat transfer wall also including a trough for collecting excess liquid fuel within said first chamber, said second chamber including means for concentrating heated fluid at said trough to maximize heat transfer through the wall in the region of said trough and to vaporize collected excess fuel in the first chamber.

5. The combination of claim 1 including first and second opposed fuel-air discharge outlets from the first chamber and wherein said inlet from said carburetor to said first chamber comprises a substantially centrally located opening to the mid portion of said first chamber from the carburetor.

* * * * *